March 18, 1924.
J. H. RANDALL
1,486,920
NONSKID BRAKE FOR VEHICLES
Filed May 20, 1921
3 Sheets-Sheet 3
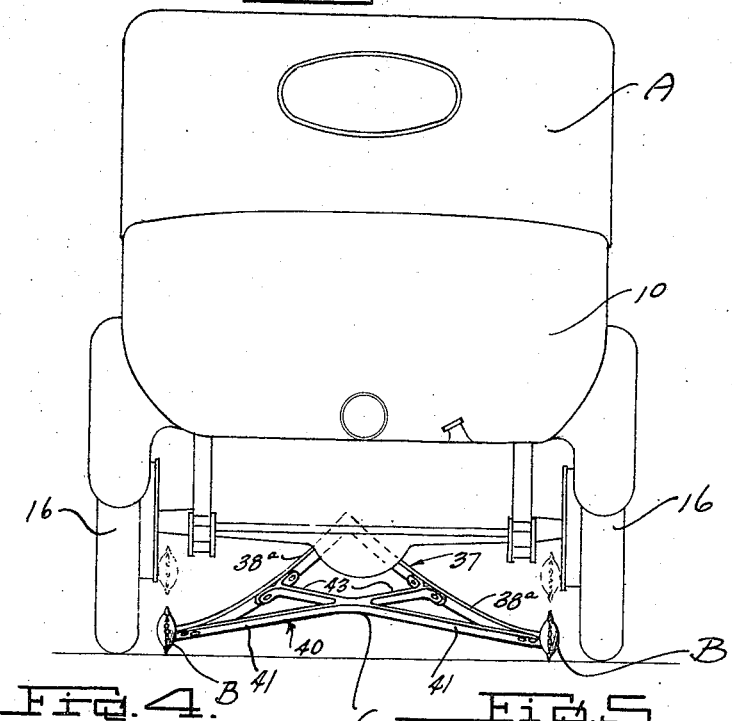
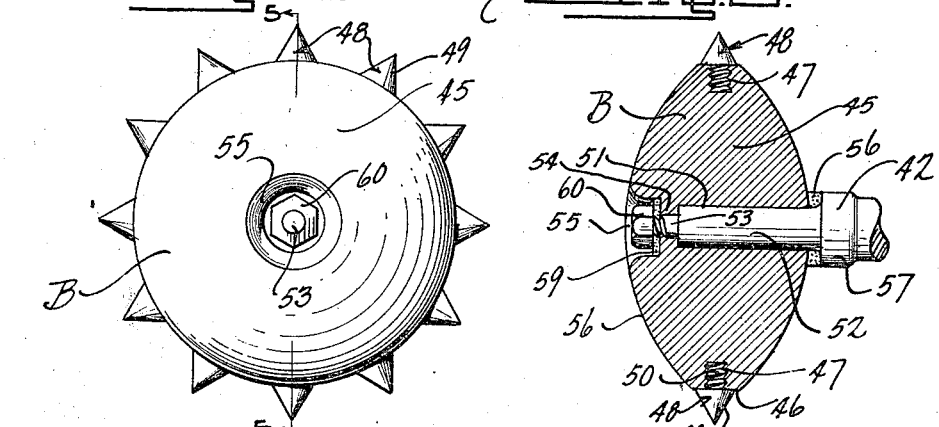
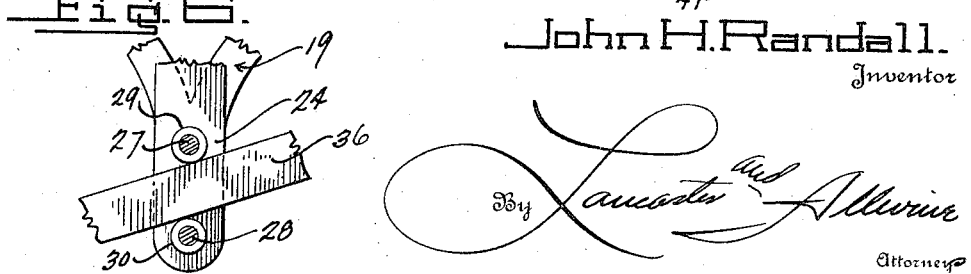
John H. Randall.
Inventor Patented Mar. 18, 1924.

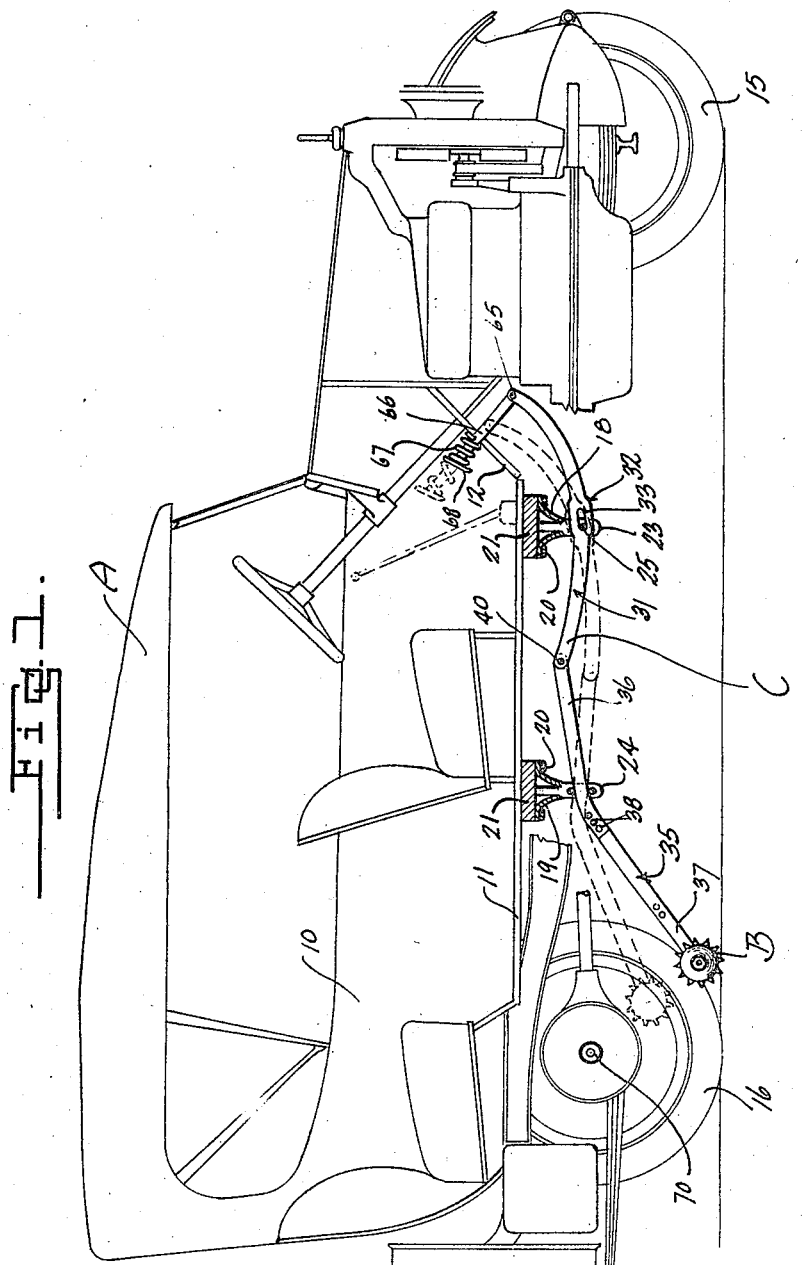

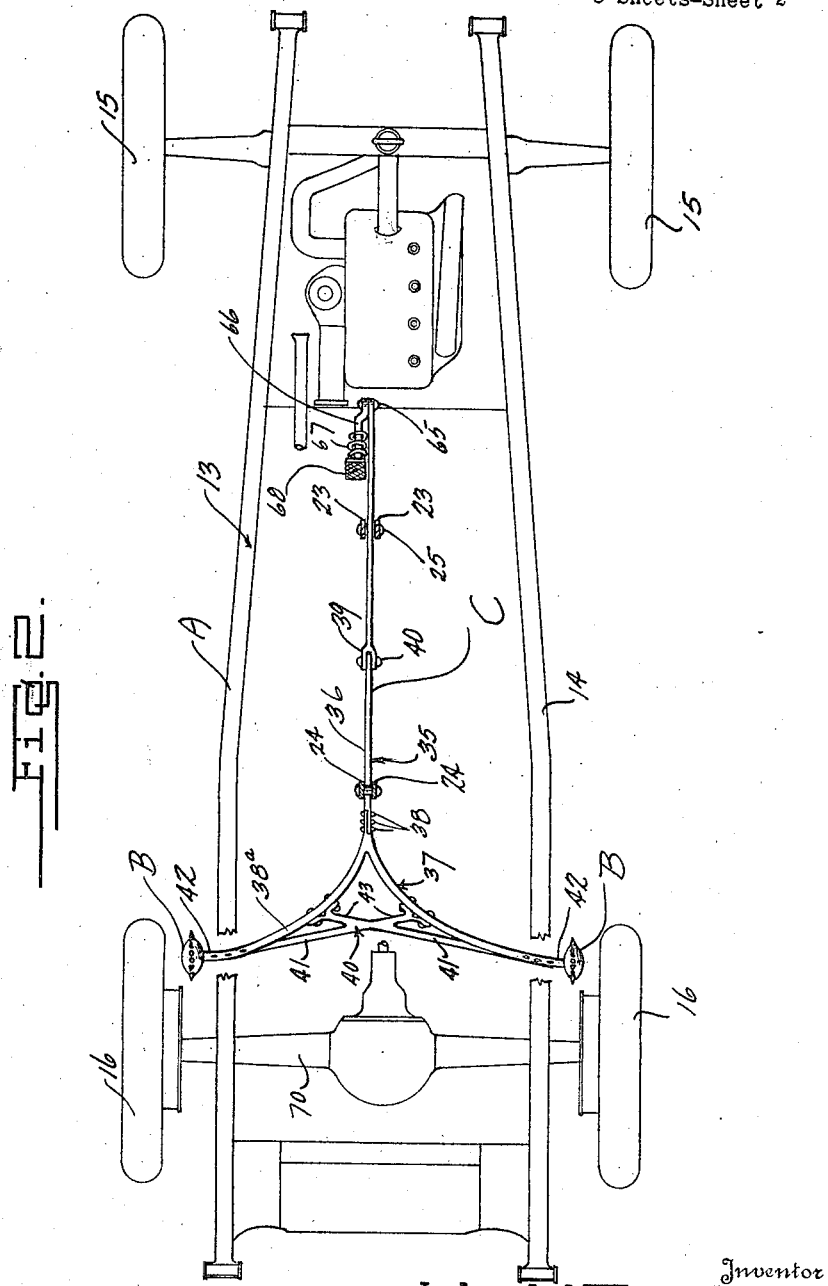

1,486,920

UNITED STATES PATENT OFFICE.

JOHN H. RANDALL, OF FORT DODGE, IOWA.

NONSKID BRAKE FOR VEHICLES.

Application filed May 20, 1921. Serial No. 471,048.

*To all whom it may concern:*

Be it known that I, JOHN H. RANDALL, a citizen of the United States, residing at Fort Dodge, in the county of Webster and State of Iowa, have invented certain new and useful Improvements in Nonskid Brakes for Vehicles, of which the following is a specification.

This invention relates to improvements in non-skid devices for automotive vehicles.

The primary object of the invention is the provision of a non-skid device which is normally maintained in inoperative position beneath a motor vehicle, and adapted for operation by the driver of said vehicle to engage a roadway and prevent lateral skidding of the vehicle.

A further and important object of the invention is the provision of a non-skid device of the above described character, including road engaging reels, placed in proximate relation to the vehicle wheels, and for contact therewith to prevent lateral skidding of the vehicle.

A further object of the invention is the provision of a device of the above described character including road engaging wheels of novel formation, to detachably receive a plurality of road engaging calks.

Other objects and advantages will be apparent during the course of the following detailed description.

In the accompanying drawings, forming a part of this specification, and in which similar reference characters designate corresponding parts throughout the several views, Figure 1 is a longitudinal cross sectional view through a motor vehicle showing the improved non-skid brake thereon.

Figure 2 is a fragmentary plan view of a motor vehicle, showing the improved nonskid brake in plan view.

Figure 3 is a rear elevation of a motor vehicle, and showing a rear view of the improved non-skid brake.

Figure 4 is a side elevation of the improved road engaging calk wheel.

Figure 5 is a cross sectional view taken on the line 5—5 of Figure 4.

Figure 6 is an enlarged fragmentary side view, showing several details of the improved non-skid device, which cooperates to support the improved wheel illustrated in Figure 4.

In the drawings, wherein for the purpose of illustration is shown the preferred embodiment of my invention, the letter A designates an automotive vehicle of any approved character, having the improved non-skid road engaging wheels B adjustably mounted beneath said automotive vehicle, as by the operating means C.

The improved non-skid device is of course susceptible of use upon various types of vehicles, and is not limited to the specific showing in the drawings. The motor vehicle A preferably comprises a body 10 having a floor 11 and foot board 12 mounted therein in ordinary manner. The body 10 is preferably mounted upon the chassis structure 13, including the channel frame 14, front supporting wheels 15, and rear supporting wheels 16.

Referring to the operating means C, a pair of brackets 18 and 19 are detachably bolted, as by means 20 beneath the floor 11 of the motor vehicle. Each of the brackets 18 and 19 are preferably mounted upon reinforcing boards or plates 21, which may be attached to the chassis frame in any suitable manner (not shown), and likewise receiving the bolt means 20 of the brackets 18 and 19. Each of the brackets 18 and 19 are provided with a pair of depending arms 23 and 24 respectively. The bracket 18 is adapted for disposition upon the bottom of the floor board 11, immediately adjacent the operating foot board 12 of the motor vehicle A. The bracket 18, is preferably provided with a roller pin 25, rotatably carried by the depending spaced arms 23 of said bracket. The bracket 19, on the other hand, is mounted rearwardly of the bracket 18, and beneath the floor 11, preferably centrally of the motor vehicle. The depending arms 24 are preferably provided with an upper and lower pin 27 and 28 respectively, in vertical alignment, and are adapted to receive the rotative sleeves 29 and 30 respectively.

The operating means C, further comprises a forward lever 31, arcuate in formation, centrally provided with an enlargement 32, and having an elongated slot 33 therein. The slot 33 extends longitudinally of the lever 31, and is adapted for disposition to receive the rotatable pin 25 of bracket 18 therein, and for a purpose to be subsequently set forth.

A second operating lever 35, hereinafter called the wheel supporting lever, is provided for use as an element of the operating means C. The lever 35, may be formed by a forward supporting bar 36, having the axle or wheel receiving portion 37 thereof rigidly connected as by bolts or rivets 38. The wheel supporting lever 35 is adapted for support by the bracket member 19; this being effected by insertion of the supporting bar 36 between the roller sleeves 29 and 30 of said bracket 19. The extreme end of the bar 36 extends forwardly of the motor vehicle, and is provided with a suitable aperture adapted for alignment with the apertures in the bifurcated end 39 of the forward lever 31. A suitable pin or pivoting element 40 is adapted for insertion through the apertures upon the ends of levers 31 and 35, for pivotally connecting said levers through the aforementioned apertures.

The axle bar 37, of the wheel lever 35 is of novel formation. The same preferably includes a substantially V-shaped element 38$^a$, having the arms or legs thereof arcuate and extending outwardly from connection of said element 38$^a$ with the bar 36, and toward the rear vehicle wheels 16. The extreme ends of the member 38$^a$, preferably project outwardly from the chassis frame 14 and into proximate relation to the vehicle wheels, to provide axle ends 42, for receiving the calk wheels B.

The wheel supporting lever, includes the bracing member 40, substantially X-shaped in formation, and adapted for riveting, or otherwise rigidly attaching to the arms of the member 38$^a$. The X-shaped member 40 is so attached to the member 38$^a$, that a long leg 41 of the member 40 is adapted for attachment to the outwardly extending axle projecting portions 42 of the member 38$^a$. Shorter arms or legs 43 of the member 40 are provided for rigid attachment to the legs of the member 38, intermediate their respective ends. By this arrangement, security is given to the wheel supporting lever 35, protecting it from severe forces incident thereto, and which will subsequently be set forth.

The calk wheels B have been designed with a view to durability and effectiveness from skidding over the road surface. Each of the wheels B preferably is formed of a solid steel disc body portion 45, said body portion being elliptical or oval in cross section, as illustrated in Figure 5. The body portion 45 is provided circumferentially with a flat surface 46. The body 45 is provided radially, and inwardly from the flat surface 46, with a plurality of evenly spaced screw threaded openings 47. The calk members 48 each include a pointed end 49 and a reduced screw threaded shank 50, and are adapted for detachable insertion into the screw threaded openings 47 of the body 45. In this manner, the various calk members 48 are positioned circumferentially about the body 45, having the pointed ends 49 projecting circumferentially to form a calk wheel B.

The solid steel body portion 45 is provided axially therethrough with a transverse opening 51 adapted to receive the axle shaft 52, formed in reduced manner upon the extreme ends 42 of the legs of the member 38$^a$. A reduced screw threaded shank 53, is formed upon the reduced axle portion 52, and adapted for insertion through the opening 51 of the body 45.

When assembling a wheel B upon the axle shaft 52 of the wheel supporting lever 35, said axle shaft 52 is inserted through the aperture 51 of the body 45, until the end thereof contacts with a shoulder 54 formed annularly in the opening 51. The screw threaded shank 53 of axle 52 is adapted for projecting forwardly from the annual shoulder 54, and into the depressed opening 55 formed in the outer face 56 of the wheel member B. The wheels B are provided for rotation upon the axle shafts 52, and in order to provide an effective arrangement, flexible washers 56 are placed upon the axle portions 52 to abut the enlargements 57, formed inwardly upon the legs of the member 38$^a$. A second washer 59 is provided for insertion in the depression 55 surrounding the screw threaded shank 53, and for having the nut 60 clamped into position thereon, said nut being secreted within the depression 55 and engaging the screw threaded shank 53. In this manner, the wheels B are assembled to the axle ends 42 of the wheel support lever 35.

The extreme forward end of the forward lever 31 is provided with a suitable opening therein for receiving a pivoting pin 65. A foot operated lever 66 is adapted for pivotally receiving the pin 65, said lever 66 projecting upwardly from the operated foot board 12 of the vehicle A, in any suitable manner. A spring 67 preferably of the resilient spiral type is provided for engagement between the head 68 of the lever 66, and the top of the board 12. The spring 67 is normally under compression to maintain the operating lever 66 in its extended position as indicated in the dotted lines in Figure 1 of the drawings.

The normal position of the improved nonskid brake is illustrated in dotted lines, shown in Figures 1 and 3 of the drawings. When in this position, the lever 66 is extended as illustrated in dotted lines in Figure 1, thus maintaining the forward end of the forward lever 31 upwardly, adjacent the inside of the board 12, and rocking the opposite end of said lever 31 downwardly. In this position, the apertured end of the bar 36 will be pivoted downwardly in alignment with the bar 31, and rocking the axle element 38$^a$ upwardly. Thus, the calk wheels B will be out of engagement with the road surface, and upwardly, to be disposed in proximity to the main axle 70 of the vehicle A.

When rounding a curve, or whenever there is any liability of the vehicle A skidding laterally, the operator instantly depresses the pedal 66, forcing the same downwardly through the floor board 12. This will rock the lever 31 upon its pivot roller 25, said movement being permitted by reason of the oscillative and reciprocable mounting of the lever 31 in slot 33 over the roller 25. This movement, of course, will likewise rock the wheel supporting lever upon the roller sleeves 29 and 30 of the bracket 19. This rocking of the lever 35 will take effect in both an oscillative and reciprocatory manner, having the effect of forcing the calk wheels B downwardly into engagement with the road surface. When in road contacting position, the calk wheels B are maintained in proximity to the main vehicle wheels; and in reality said wheels B extend outwardly from the chassis frame 14, as illustrated in Figure 2 of the drawings. It is preferred that the calk wheels B, be mounted forwardly of the axle 70 of the vehicle A, and independent thereof. The operating levers 31 and 35 are of course rigid in their maintenance of the calk wheel B in engagement with the road surface. The operating means C, is however, of sufficient flexibility to yield laterally, since the primary insertion of the calks in a road surface will not instantly stop lateral skidding of the vehicle A. By reason of this, the vehicle wheels 16 will skid, until the same engage the outer surface of one of the calk wheels B.

From the foregoing, it can be seen that an improved and highly useful non-skid brake has been provided, in which lateral skidding of a vehicle can positively be prevented; the means for preventing such lateral skidding normally being foldable under a motor vehicle to which the same is attached, and out of the way.

Various changes in the shape, size and arrangement of parts may be made to the form of the invention herein shown and described, without departing from the spirit of the invention or the scope of the claims.

I claim:

1. In a non-skid device, the combination with a motor vehicle, of a non-skid road engaging wheel, brackets beneath said vehicle, and pivotally connected operating means oscillatively and reciprocably carried by said brackets, and supporting said non-skid wheel for selective engagement with a road way.

2. In a non-skid device, the combination with a motor vehicle, of a non-skid road engaging calk wheel, brackets rigidly mounted beneath the motor vehicle including roller members, lever means oscillatively and pivotally carried upon said rollers and supporting said road engaging wheel for operation to engage a road surface to prevent lateral skidding of the motor vehicle.

3. In a non-skid device for motor vehicles, the combination of non-skid calk wheels, and means operatively connecting said non-skid calk wheels beneath a motor vehicle, said means including a forward lever oscillatively carried by said motor vehicle, a rear wheel supporting lever oscillatively and reciprocably carried by said motor vehicle and pivotally connected to an end of said forward lever, and pedal means for operating said levers to depress said calk wheels into engagement with a road surface.

4. In an anti-skid device for motor vehicles, the combination of a forward lever oscillatively carried below the motor vehicle intermediate its ends, a rear lever frame oscillatively carried below the motor vehicle intermediate its ends, means connecting the rear end of the forward lever to the forward end of the rear lever frame, operating means for the forward end of the forward lever, said rear lever frame extending laterally at its rear end to adjacent the rear wheels of the motor vehicle, and road engaging calk means on said laterally extending ends of the rear lever adjacent the rear wheels of the motor vehicle.

JOHN H. RANDALL.